United States Patent
Inokawa

(10) Patent No.: US 8,212,797 B2
(45) Date of Patent: Jul. 3, 2012

(54) VIDEO SIGNAL PROCESSING DEVICE AND DISPLAY

(75) Inventor: Hiroyuki Inokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 844 days.

(21) Appl. No.: 11/818,289

(22) Filed: Jun. 14, 2007

(65) Prior Publication Data

US 2007/0291167 A1 Dec. 20, 2007

(30) Foreign Application Priority Data

Jun. 16, 2006 (JP) ................. P2006-166831

(51) Int. Cl.
*G09G 5/00* (2006.01)

(52) U.S. Cl. ........ 345/204; 345/629; 345/660; 715/800; 348/598; 348/600

(58) Field of Classification Search .......... 345/204, 345/629, 660, 603, 667–671; 348/598–600, 348/445, 448, 556, 557; 715/800, 815
See application file for complete search history.

(56) References Cited

U.S. PATENT DOCUMENTS

| | | | | |
|---|---|---|---|---|
| 5,138,307 A * | 8/1992 | Tatsumi | ................ | 345/629 |
| 5,249,049 A | 9/1993 | Kranawetter et al. | | |
| 5,914,757 A * | 6/1999 | Dean et al. | ................ | 348/584 |
| 5,995,146 A * | 11/1999 | Rasmussen | ................ | 375/240.01 |
| 6,330,036 B1 * | 12/2001 | Murakami et al. | ................ | 348/555 |
| 6,380,948 B1 * | 4/2002 | Murayama et al. | ................ | 345/660 |
| 6,590,615 B2 * | 7/2003 | Murakami et al. | ................ | 348/555 |
| 6,636,222 B1 * | 10/2003 | Valmiki et al. | ................ | 345/505 |
| 6,885,406 B2 * | 4/2005 | Yui et al. | ................ | 348/564 |
| 7,006,156 B2 * | 2/2006 | Hirase et al. | ................ | 348/600 |
| 7,142,249 B2 * | 11/2006 | Hahn et al. | ................ | 348/458 |
| 7,148,909 B2 * | 12/2006 | Yui et al. | ................ | 345/660 |
| 7,190,338 B2 * | 3/2007 | Kubota et al. | ................ | 345/89 |
| 7,423,658 B1 * | 9/2008 | Uomori et al. | ................ | 345/660 |
| 7,639,268 B2 * | 12/2009 | Tsunoda | ................ | 345/635 |
| 7,656,461 B2 * | 2/2010 | Dunn et al. | ................ | 348/715 |
| 2004/0189870 A1 * | 9/2004 | Champion et al. | ................ | 348/510 |
| 2005/0134739 A1 * | 6/2005 | Bian | ................ | 348/600 |

FOREIGN PATENT DOCUMENTS

| | | |
|---|---|---|
| JP | 6 274411 | 9/1994 |
| JP | 10 124285 | 5/1998 |
| JP | 11 15453 | 1/1999 |
| JP | 2001 100718 | 4/2001 |
| JP | 2001 282173 | 10/2001 |
| JP | 2001 283211 | 10/2001 |
| JP | 2005 156731 | 6/2005 |
| JP | 2006 106358 | 4/2006 |

* cited by examiner

*Primary Examiner* — Lun-Yi Lao
*Assistant Examiner* — Tom Sheng
(74) *Attorney, Agent, or Firm* — Frommer Lawrence & Haug LLP; William S. Frommer; Thomas F. Presson

(57) ABSTRACT

A video signal processing device that includes first and second input terminals and a size changer configured to change an image size of an image to be displayed based on a video signal input from the second input terminal. A mixer is configured to mix a video signal input from the first input terminal with a video signal that has passed through the size changer, and an output terminal is configured to output a video signal arising from mixing by the mixer.

4 Claims, 5 Drawing Sheets

RELATED ART

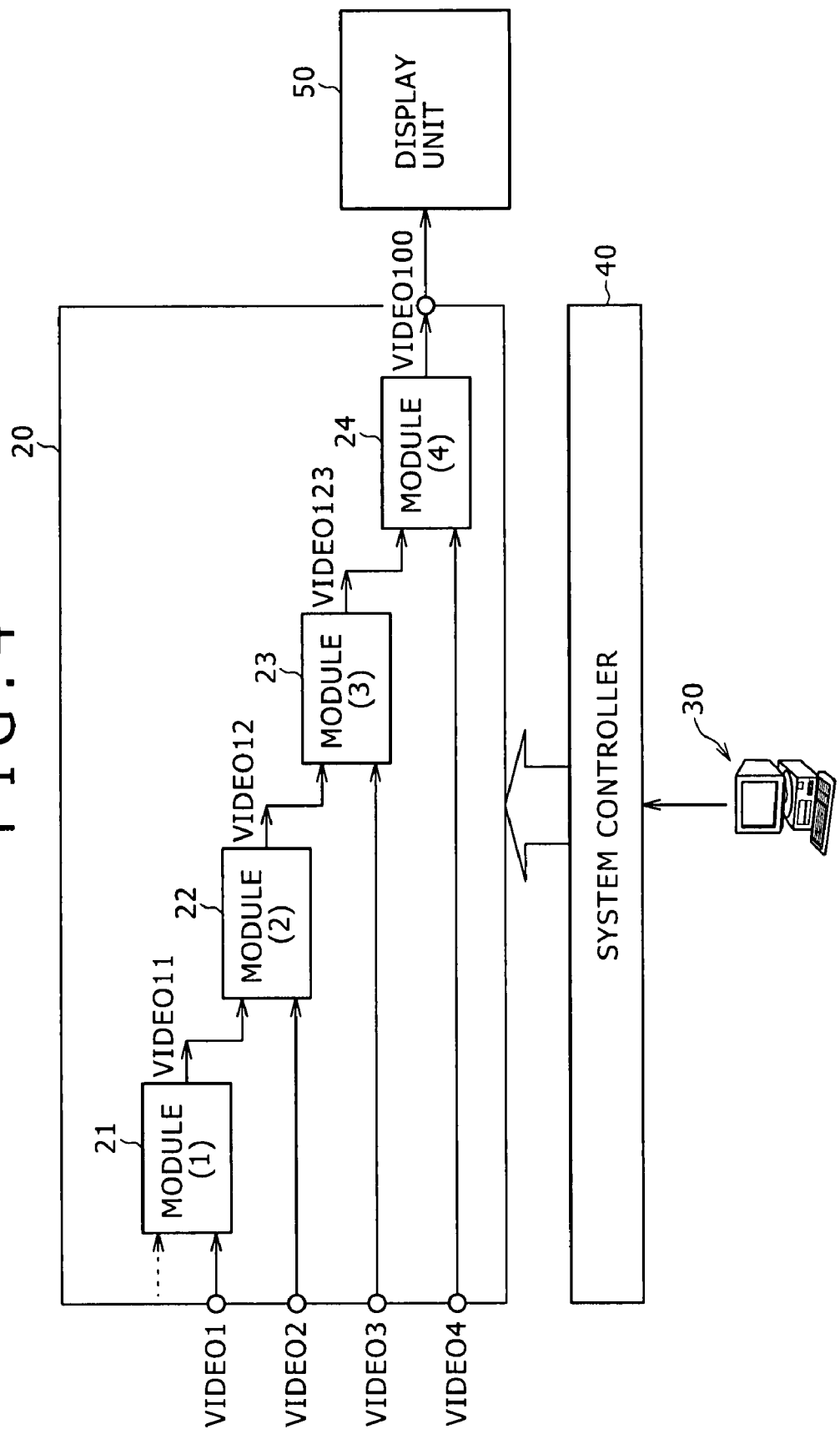

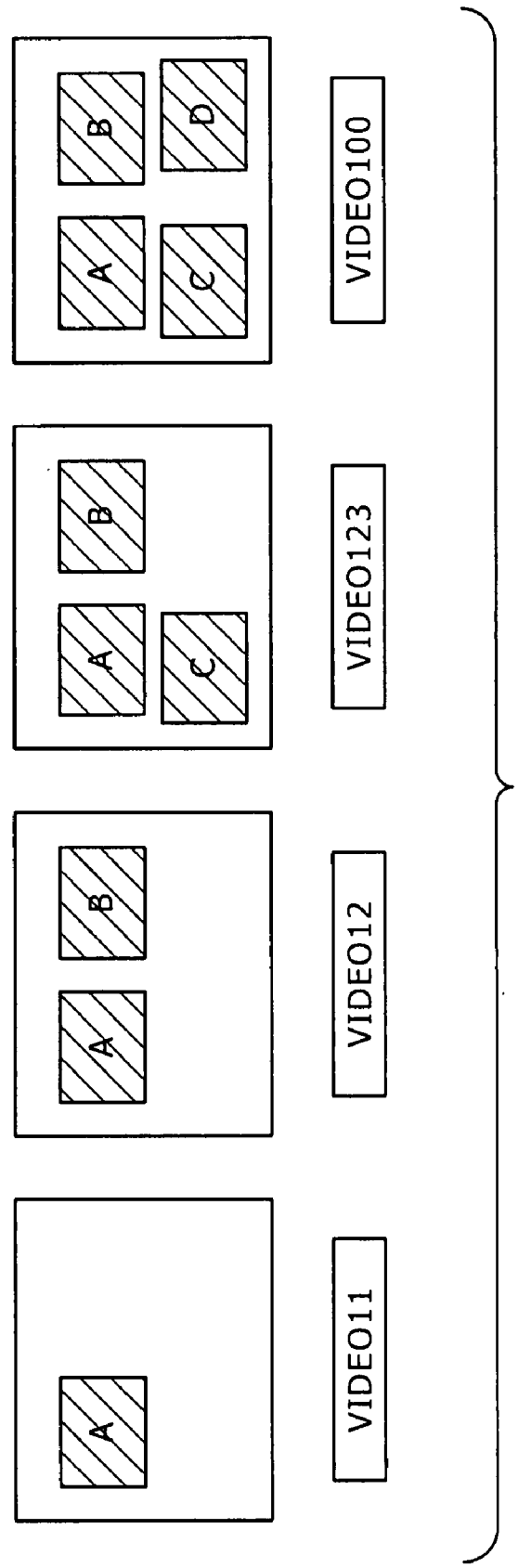

VIDEO SIGNAL PROCESSING DEVICE AND DISPLAY

CROSS REFERENCES TO RELATED APPLICATIONS

The present invention contains subject matter related to Japanese Patent Application JP 2006-166831 filed in the Japan Patent Office on Jun. 16, 2006, the entire contents of which being incorporated herein by reference.

BACKGROUND OF THE INVENTION

1. Field of the Invention

The present invention relates to video signal processing devices and displays, and particularly to a video signal processing device that executes signal processing for displaying plural screens (multi-screens) on one display screen and a multi-screen display employing the video signal processing device.

2. Description of the Related Art

In recent years, the size of screens of displays is becoming larger. Furthermore, as the definition of displayed images becomes higher, the amount of information that can be displayed is getting larger. As one of displays having a particularly large screen, a so-called multi-screen (multi-window) display for displaying plural screens (multi-screens) on one display screen is known (refer to e.g. Japanese Patent Laid-open No. 2001-100718).

FIG. 1 shows the basic configuration of a video signal processing device for realizing four multi-screens according to a related art. The video signal processing device includes four video input circuits 101A, 101B, 101C, and 101D and four frame memories 102A, 102B, 102C, and 102D that are provided corresponding to four screens, and a mixer (MIX) 103. For simplification of the drawing, a control system that controls the timings of writing/reading to/from the frame memories 102A, 102B, 102C, and 102D is not shown in the drawing.

The video input circuits 101A, 101B, 101C, and 101D convert a signal of any of various video formats, such as an analog video signal or digital video signal (digital visual interface (DVI) signal, serial digital interface (SDI) signal, high definition (HD)-SDI signal, or the like) into a signal of a common format for use inside the device, such as an R (red) G (green) B (blue) signal.

The frame memories 102A, 102B, 102C, and 102D are used to convert an interlace signal into a progressive signal (I/P conversion) and change the size of input video (scaling). In addition, the frame memories 102A, 102B, 102C, and 102D output video signals VIDEO11, VIDEO12, VIDEO13, and VIDEO14 in accordance with a reference synchronizing signal for superposition of the video signals with each other. The video signals VIDEO11, VIDEO12, VIDEO13, and VIDEO14 are output after being reduced to e.g. about ¼.

The mixer 103 superimposes (mixes) the video signals VIDEO11, VIDEO12, VIDEO13, and VIDEO14 output from the frame memories 102A, 102B, 102C, and 102D, and outputs the resultant signal as one video signal VIDEO100.

FIG. 2 shows an image of the mixing of four video signals VIDEO11, VIDEO12, VIDEO13, and VIDEO14 into one video signal VIDEO100 and the displaying of the video signal VIDEO100.

As is apparent from FIG. 2, the video signal processing device having the above-described configuration allows the video signals VIDEO11, VIDEO12, VIDEO13, and VIDEO14 input through multi-channels (four channels, in the present example) to be displayed on one display screen.

However, in the video signal processing device with the above-described configuration according to a related art, the video input circuits 101A, 101B, 101C, and 101D are disposed in parallel for video inputs on plural channels. This configuration imposes a limitation on the number of inputs in the system and therefore is insufficient in versatility. For example, when a system configuration with four inputs like the configuration of FIG. 1 is employed, it is impossible to input video signals through five or more inputs.

On the other hand, when a system configuration with eight inputs is employed, for a user who uses only four inputs, the circuit part corresponding to the remaining four inputs is unnecessary. Accordingly, this system is unnecessarily expensive for this user. It would be also possible to employ a configuration from which the video input circuits and the frame memories corresponding to the remaining four inputs have been eliminated in advance. However, even in this configuration, at least the mixer 103 needs to have a configuration compatible with the maximum eight inputs. Therefore, for the user who uses only four inputs, at least the circuit part of the mixer 103 corresponding to the remaining four inputs is unnecessary.

SUMMARY OF THE INVENTION

There is a need for the present invention to provide a video signal processing device that allows the number of multi-screens (windows) to be easily changed depending on the system configuration without imposing of a cost burden, and a display employing the video signal processing device.

According to an embodiment of the present invention, there is provided a video signal processing device that includes first and second input terminals, a size changer configured to change the image size of an image to be displayed based on a video signal input from the second input terminal, a mixer configured to mix a video signal input from the first input terminal with a video signal that has passed through the size changer, and an output terminal configured to output a video signal arising from mixing by the mixer.

The video signal processing device with this configuration is formed as a module, and plural modules are cascaded to each other for construction of a multi-screen display. That is, merely by cascading the same number of the modules as the number of inputs for video signals, a system that realizes multi-screens through superposition of the same number of video signals as the number of the inputs with each other can be easily constructed.

According to an embodiment of the present invention, a system for realizing multi-screens can be constructed merely by cascading the same number of modules as the number of inputs for video signals to each other. Therefore, merely by changing the number of the modules cascaded to each other, the number of the multi-screens can be easily changed without imposing of a cost burden.

BRIEF DESCRIPTION OF THE DRAWINGS

FIG. 4 is a block diagram schematically showing the configuration of a multi-screen display according to an application example of the embodiment; and FIG. 5 is a diagram showing one example of the image sizes and the relationship of the displaying positions of the respective displayed images on one display screen based on video signals VIDEO11, VIDEO12, VIDEO123, and VIDEO100 output from four modules cascaded to each other.

DETAILED DESCRIPTION OF THE PREFERRED EMBODIMENTS

An embodiment of the present invention will be described in detail below with reference to the accompanying drawings.

Figure 3:
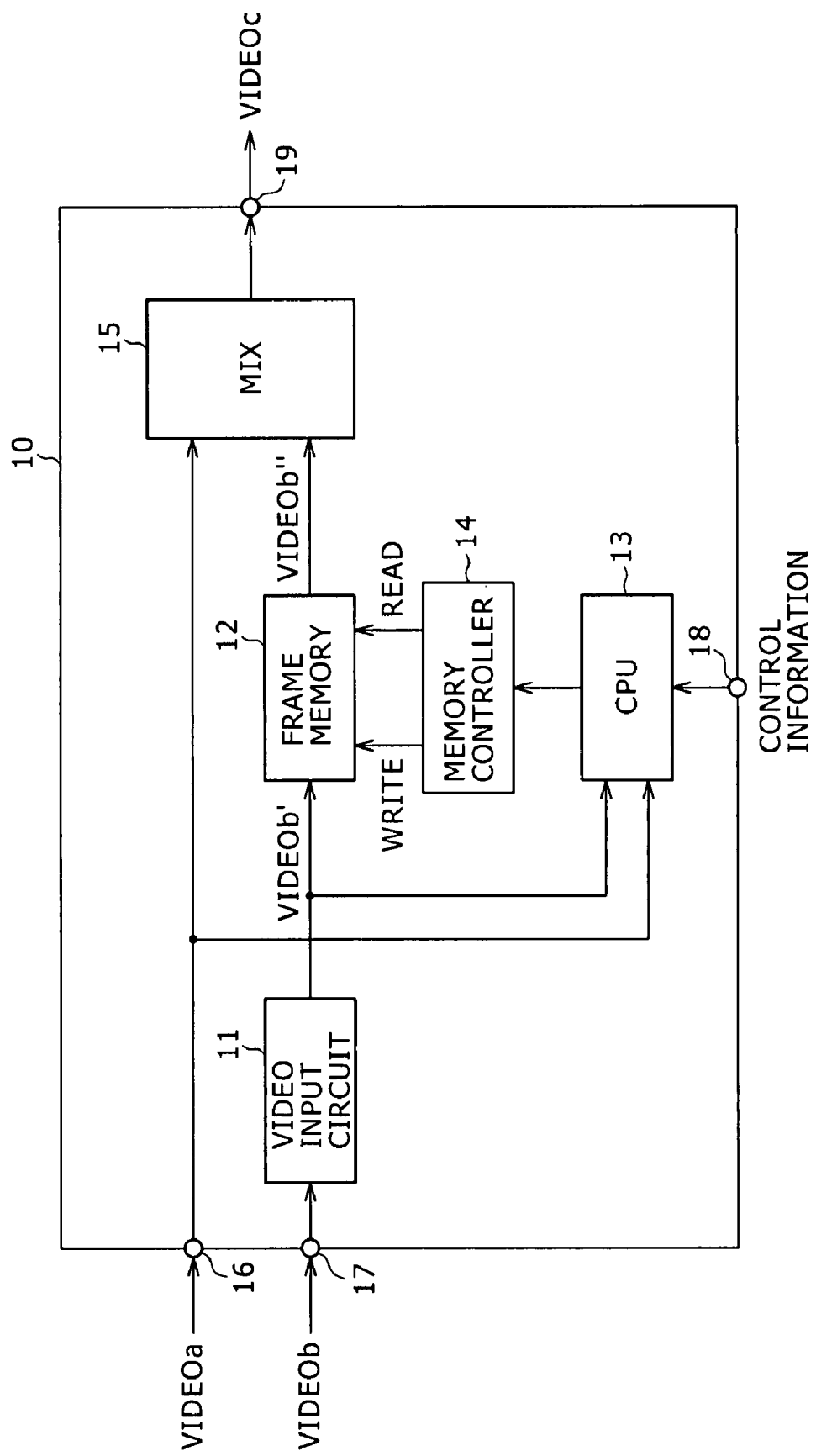
FIG. 3 is a block diagram showing a video signal processing device according to one embodiment of the present invention.

FIG. 3 is a block diagram showing a video signal processing device according to one embodiment of the present invention. As shown in FIG. 3, a video signal processing device 10 according to the present embodiment includes a video input circuit 11, a frame memory 12, a CPU 13, a memory controller 14, and a mixer (MIX) 15. Furthermore, the video signal processing device 10 has two input terminals 16 and 17, one control terminal 18, and one output terminal 19. The video signal processing device 10 is formed as a module, i.e., as an attachable/detachable component.

Through the input terminals 16 and 17, the video signal processing device 10 is fed with first and second input signals VIDEOa and VIDEOb, such as an analog video signal or digital video signal (DVI, SDI, HD-SDI signal or the like). The video input circuit 11 converts any of the various video formats of the analog video signal or digital video signal input through the input terminal 17 into e.g. the R (red) G (green) B (blue) signal format.

Control of writing of a video signal VIDEOb' output from the video input circuit 11 to the frame memory 12 is implemented by the memory controller 14 under control by the CPU 13. Furthermore, control of reading of the written video signal from the frame memory 12 is also implemented by the memory controller 14. The frame memory 12 has a memory capacity compatible with the screen size of a display for displaying a video signal VIDEOc output from the video signal processing device 10 after mixing.

The CPU 13 controls the memory controller 14 so that the memory controller 14 can control the timing of the writing of a video signal to the frame memory 12 in synchronization with a synchronizing signal included in the video signal VIDEOb' output from the video input circuit 11, and so that the memory controller 14 can control the timing of the reading of a video signal from the frame memory 12 in synchronization with a synchronizing signal included in a video signal VIDEOa input through the input terminal 16.

The control by the CPU 13 for the control of the timings of the writing/reading to/from the frame memory 12 by the memory controller 14 is based on a control signal input from the external of the video signal processing device 10 via the control terminal 18, i.e., control information such as information on the image size at the time of displaying of the video signal VIDEOb and information on the displaying position.

Due to the writing/reading control by the memory controller 14 under the control by the CPU 13, the frame memory 12 executes image processing for conversion of an interlace signal into a progressive signal (I/P conversion), a change of the size of an image to be displayed based on the input video signal VIDEOb (scaling), and determination of the displaying position on a display screen. When image reduction processing is executed in the image processing for a size change (enlargement/reduction), e.g. a signal for a black background is output from the frame memory 12 for the image part other than the reduced video part.

The mixer 15 superimposes the video signal VIDEOa input via the input terminal 16 with a video signal VIDEOb" output from the frame memory 12 in synchronization with the video signal VIDEOa, and outputs the resultant signal as the video signal VIDEOc from the output terminal 19 to the external of the module (video signal processing device 10). This signal superposition is based on the premise that the video signal VIDEOa is a progressive signal similarly to the video signal VIDEOb" output from the frame memory 12.

By cascading plural stages of video signal processing devices 10 each having the above-described configuration and each formed as a module, i.e., by connecting the video signal processing devices 10 at multiple stages to each other in a hierarchy, a system can be constructed in which each of the modules superimposes the video signal VIDEOb input thereto with the video signal VIDEOa output from the previous-stage module to thereby produce the video signal VIDEOc and then outputs the video signal VIDEOc as the video signal VIDEOa to the subsequent-stage module.

If the video signal processing device 10 is employed, merely by cascading the same number of the modules as the number of inputs for video signals, a system that realizes multi-screens through superposition of the same number of video signals as the number of the inputs with each other can be easily constructed. Thus, as the circuit configuration of the finally constructed system, the minimum necessary configuration corresponding to the number of the inputs is enough. Furthermore, merely by changing the number of the modulus cascaded to each other, the number of multi-screens (windows) can be easily changed without imposing of a cost burden.

In addition, it is sufficient for the mixer 15 in each module to have the minimum necessary configuration for superimposing the video signal VIDEOb input to the module of the mixer 15 with the video signal VIDEOa output from the previous-stage module, i.e., for superimposing only two video signals with each other. Therefore, the circuit configuration of each module is very simple. As a result, the entire system constructed by cascading plural stages of the modules is formed only of the circuit part necessary for the respective input video signals, and therefore also has a very simple circuit configuration.

In the present embodiment, by use of the frame memory 12 combined with the CPU 13 and the memory controller 14, a size changer for changing the image size of an image to be displayed is constructed for realization of the function of scaling processing (processing for a change (enlargement/reduction) of an image to be displayed). However, this configuration is merely one example, and it is also possible to use a finite impulse response (FIR) filter or the like instead of the frame memory if the reduction processing is simple. It is only necessary for this block to realize a change (reduction/enlargement) of an image to be displayed based on an input video signal. Therefore, the block may have any configuration as long as the block has a function permitting realization of this change processing.

FIG. 4 is a block diagram schematically showing the configuration of a multi-screen display for displaying four multi-screens (multi-windows) according to an application example of the present embodiment. As shown in FIG. 4, the multi-screen display according to the present application example includes a video signal processor 20, a personal computer 30, a system controller 40, and a display unit 50.

The video signal processor 20 has a configuration in which four modules (1)21, (2)22, (3)23, and (4)24 corresponding to four screens are cascaded to each other. Four video signals VIDEO1, VIDEO2, VIDEO3, and VIDEO4 corresponding to four screens are input to the video signal processor 20.

Figure 1:
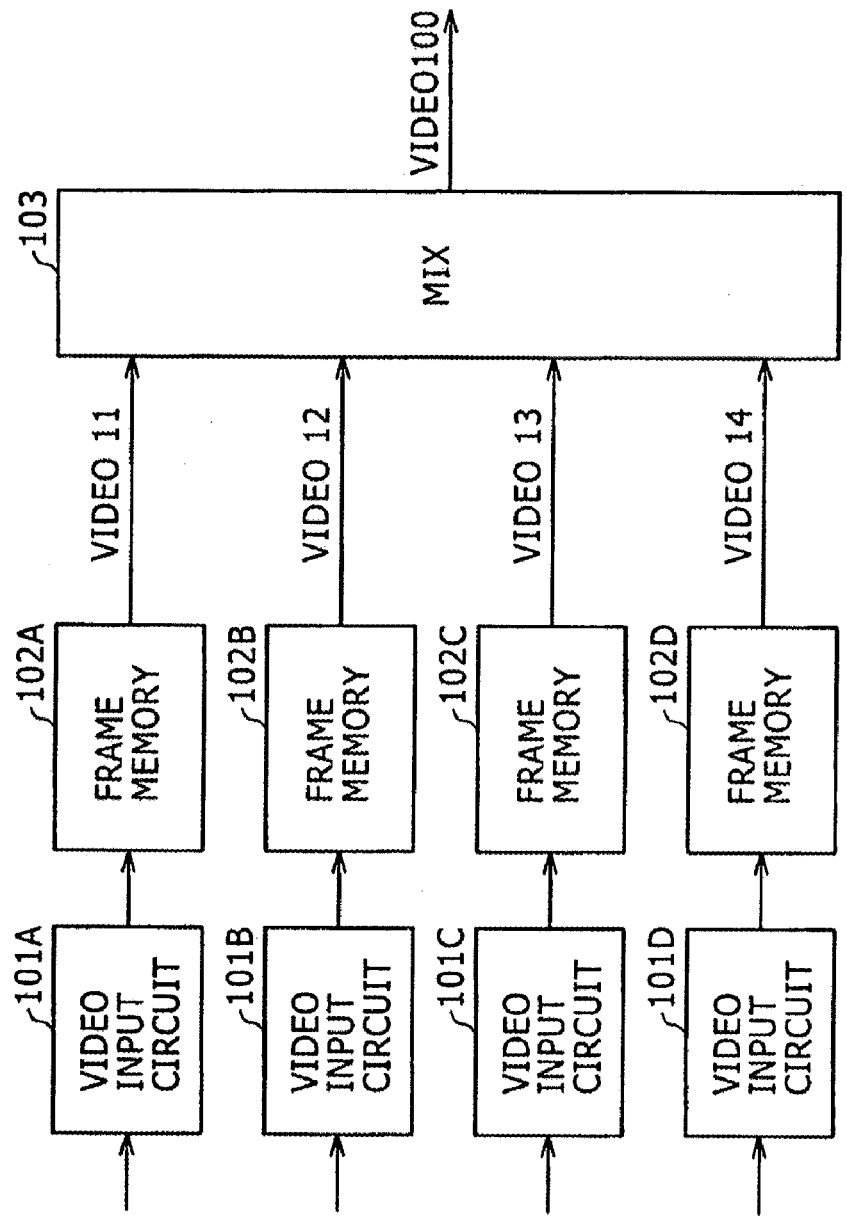
FIG. 1 is a block diagram showing the basic configuration of a video signal processing device for realizing four multi-screens according to a related art.
Figure 2:
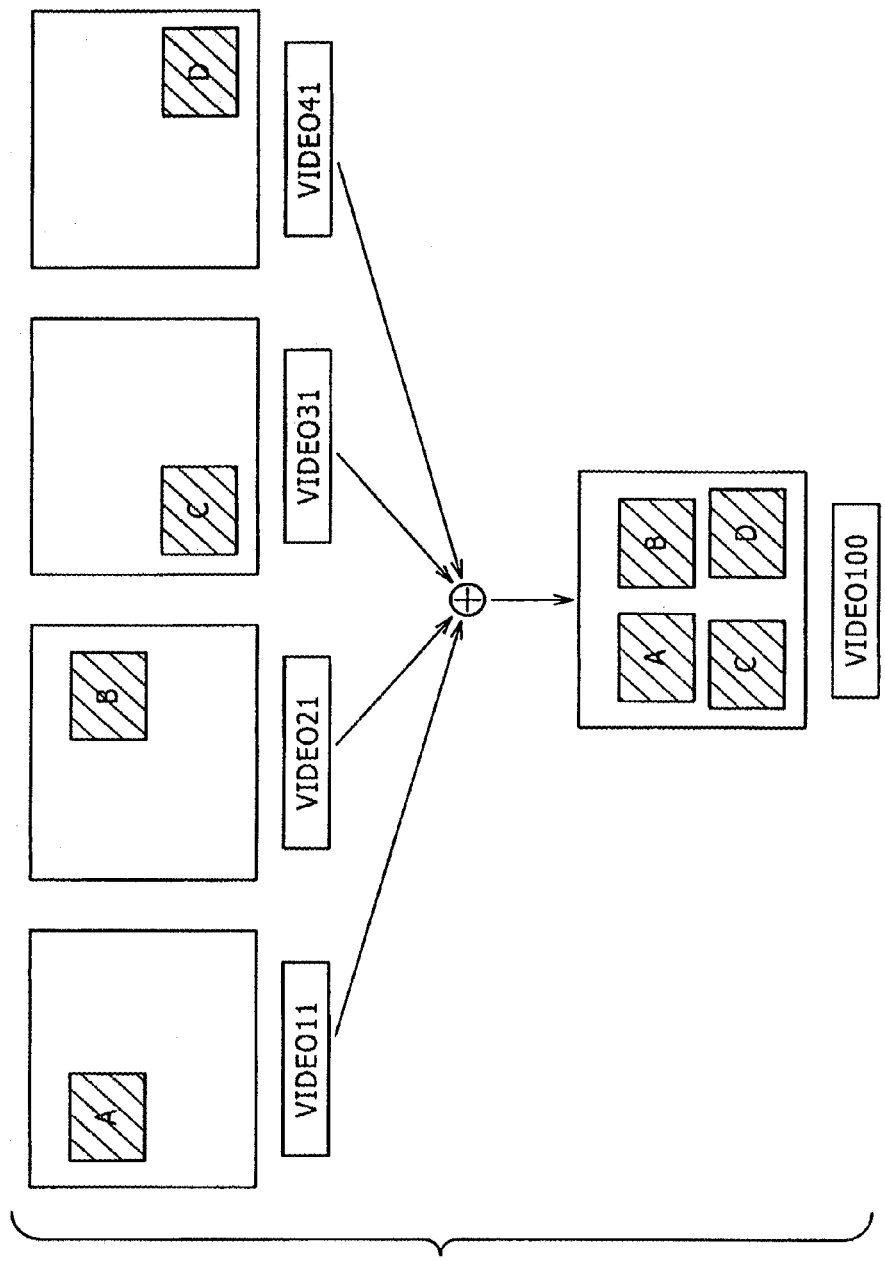
FIG. 2 is a diagram showing an image of mixing of four video signals VIDEO11, VIDEO12, VIDEO13, and VIDEO14 into one video signal VIDEO100 and displaying of the video signal VIDEO100.

Each of these four modules (1)21, (2)22, (3)23, and (4)24 has the same circuit configuration as that of the video signal processing device 10 shown in FIG. 1. Specifically, each module is formed as an attachable/detachable component that includes the video input circuit 11, the frame memory 12, the CPU 13, the memory controller 14, and the mixer 15, and has two input terminals 16 and 17, one control terminal 18, and one output terminal 19.

To the first-stage module (1)21, only the video signal VIDEO1 is input. The module (1)21 subjects the video signal VIDEO1 to image processing for conversion of an interlace signal into a progressive signal (I/P conversion), a change of the size of an image to be displayed (scaling), and determination of the displaying position on the display screen, and then outputs the resultant signal as a video signal VIDEO11 to the subsequent-stage module (2)22.

The second-stage module (2)22 executes I/P conversion, scaling, and displaying position determination for the video signal VIDEO2 input thereto, and then superimposes the resultant signal with the video signal VIDEO11 output from the previous-stage module (1)21 to thereby output the resultant signal as a video signal VIDEO12 to the subsequent-stage module (3)23.

The third-stage module (3)23 executes I/P conversion, scaling, and displaying position determination for the video signal VIDEO3 input thereto, and then superimposes the resultant signal with the video signal VIDEO12 output from the previous-stage module (2)22 to thereby output the resultant signal as a video signal VIDEO123 to the last-stage module (4)24.

The last-stage module (4)24 executes I/P conversion, scaling, and displaying position determination for the video signal VIDEO4 input thereto, and then superimposes the resultant signal with the video signal VIDEO123 output from the previous-stage module (3)23 to thereby output the resultant signal as a final mixed video signal VIDEO100.

FIG. 5 shows one example of the image sizes and the relationship of the displaying positions of the respective displayed images on one display screen based on the video signals VIDEO11, VIDEO12, VIDEO123, and VIDEO100 output from the modules (1)21, (2)22, (3)23, and (4)24, respectively.

For the interconnection of four modules (1)21, (2)22, (3)23, and (4)24 in the video signal processor 20, these modules may be cascaded by cables. Alternatively, plural connectors arranged on a motherboard attached to a dedicated chassis may be electrically cascaded to each other.

In accordance with operation by a user, the personal computer 30 supplies the system controller 40 with control information (control signal) for specifying the image sizes and the displaying positions on one display screen regarding the respective images to be displayed based on four video signals VIDEO1, VIDEO2, VIDEO3, and VIDEO4.

The system controller 40 is formed of a CPU and so on, and controls the entire video signal processor 20 in accordance with the control information supplied from the personal computer 30. Specifically, the system controller 40 controls the I/P conversion, scaling, displaying position determination, and so on in the modules (1)21, (2)22, (3)23, and (4)24.

Instead of the configuration in which the entire video signal processor 20 is controlled by the system controller 40 based on the control information supplied from the personal computer 30, a configuration may be employed in which, without the intermediary of the system controller 40, the personal computer 30 directly controls the I/P conversion, scaling, displaying position determination, and so on in the modules (1)21, (2)22, (3)23, and (4)24.

The display unit 50 is formed of a display such as a liquid crystal display or plasma display having a large screen comparable to e.g. a screen of 4096 (the number of pixels along the horizontal direction)×2160 (the number of pixels along the vertical direction), and displays four images based on the mixed video signal VIDEO100 output from the video signal processor 20 on its one display screen. The display unit 50 is not limited to a flat display such as a liquid crystal display or plasma display but may be another display such as a projector display as long as it has a large screen.

If a multi-screen display is constructed by using the video signal processor 20 formed by cascading the same number of modules each including as its basic configuration the video input circuit 11, the frame memory 12, the CPU 13, the memory controller 14, and the mixer 15 as the number of inputs for video signals as described above, simplified circuit configurations of the entire video signal processor 20 and the entire multi-screen display can be achieved, because each module has the minimum necessary circuit configuration for superimposing a video signal input thereto with a video signal output from the previous-stage module, i.e., for superimposing only two video signals with each other.

Moreover, if a system configuration in which connectors to/from which the modules can be attached/detached are electrically cascaded to each other is employed for the cascading of the modules, a user can optionally set the number of the modules cascaded to each other to any number through attachment/detachment of the modules to/from the connectors. This allows also optional increase in the number of screens (windows) within the range of the number of the connectors.

For example, even when a user uses only four inputs of eight inputs in a system configuration compatible with the maximum eight inputs, i.e., a system configuration in which eight connectors are electrically cascaded to each other on a motherboard, it is sufficient to set four modules having the minimum necessary circuit configuration for four inputs. As for the remaining four inputs, the connectors electrically cascaded to each other are left as they are. Therefore, for both a user who uses the maximum eight inputs and a user who uses only four inputs, the cost of the entire system is inexpensive cost corresponding to the number of the modules.

Furthermore, as is apparent from the description with FIG. 3, in each of the modules, image processing for I/P conversion, scaling, displaying position determination, and so on is executed for the video signal input thereto (video signals VIDEO2, VIDEO3, and VIDEO4, in the example of FIG. 4) in synchronization with the video signal output from the previous-stage module (video signals VIDEO11, VIDEO12, and VIDEO123, in the example of FIG. 4). Therefore, no matter how many modules are cascaded, an output screen formed of multi-screens each having any image size can be created without the occurrence of delay as a whole.

For video edit and video check in a broadcasting station or the like, a configuration is traditionally employed in which plural displays such as CRT displays having a screen size of about 10 to 20 inches are arranged and used. However, a current trend change from the CRT displays toward flat displays such as liquid crystal displays and plasma displays provides a tendency that the screen size of professional-use displays is increased to 30 to 40 inches or larger. As the screen size is increased, the necessity for multi-screens (multi-windows) is ever-increasing inevitably.

If the multi-screen display according to the present application example is used for video edit and video check in a broadcasting station or the like, the video edit and the video check in a broadcasting station or the like can be realized with one multi-screen display. Therefore, the display-placement space can be reduced compared with a system configuration in which plural displays such as cathode ray tube (CRT) displays having a screen size of about 10 to 20 inches are arranged and used.

In addition, merely by adding the modules, the number of windows can be optionally increased to any number. Moreover, even when a display having a larger screen with a larger number of pixels is used, it is possible to easily address the increase in the display screen size because the modules have the function of scaling processing (processing for a change (enlargement/reduction) of an image to be displayed) and hence can regulate the sizes of images to be displayed depending on the screen size.

"It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing device comprising:
   first and second input terminals;
   a size changer configured to change an image size of an image to be displayed based on a video signal input from the second input terminal and to convert the video signal input from the second input terminal to a progressive signal;
   a video input circuit configured to convert the video signal input from the second input signal into a video signal that has a same color format as that of a video signal input from the first input terminal;
   a mixer configured to mix the video signal input from the first input terminal with a video signal that has passed through the size changer; and
   an output terminal configured to output a video signal arising from mixing by the mixer,
   wherein the size changer includes a memory controller that controls reading and writing data from a frame memory of the size changer under the control of a CPU,
   wherein the size changer further determines a displaying position of the converted video signal in a display screen,
   wherein the video signal processing device is an attachable/detachable component connected with a plurality of the same video signal processing devices in a hierarchy manner,
   wherein the number of the plurality of the same video signal processing devices is changed in accordance with a number of multi-screens that are used in the display screen,
   wherein the first input terminal is connected directly to the mixer with no image processing modules in between so that the video signal input from the first input terminal is input to the mixer without alteration, and
   wherein when an image reduction processing is executed for a size change, a signal for a black background is output for an image part other than a reduced video part.

2. The video signal processing device according to claim 1, wherein the size changer executes processing for a video signal input from the second input terminal in synchronization with a video signal input from the first input terminal.

3. A display comprising:
   a video signal processor configured to be formed by cascading a plurality of modules to each other, each of the modules including first and second input terminals, a size changer that changes an image size of an image to be displayed based on a video signal input from the second input terminal, a mixer that mixes a video signal input from the first input terminal with a video signal that has passed through the size changer, and an output terminal that outputs a video signal arising from mixing by the mixer; and
   a display unit configured to display the same number of screens as the number of the modules on one display screen in accordance with a mixed video signal output from the module at a last stage in the video signal processor,
   wherein the size changer includes a memory controller that controls reading and writing data from a frame memory of the size changer under the control of a CPU,
   wherein the size changer further determines a displaying position of the converted video signal in a display screen,
   wherein the video signal processing device is an attachable/detachable component connected with a plurality of the same video signal processing devices in a hierarchy manner,
   wherein the number of the plurality of the same video signal processing devices is chanced in accordance with a number of multi-screens that are used in the display screen,
   wherein the first input terminal is connected directly to the mixer with no image processing modules in between so that the video signal input from the first input terminal is input to the mixer without alteration, and
   wherein when an image reduction processing is executed for a size change, a signal for a black background is output for an image part other than a reduced video part,
   wherein the size changer further changes the video signal input from the second input terminal to a progressive signal, and
   wherein each of the modules further includes a video input circuit configured to convert the video signal input from the second input signal into a video signal that has a same color format as that of a video signal input from the first input terminal.

4. The display according to claim 3, wherein the size changer executes processing for a video signal input from the second input terminal in synchronization with a video signal input from the first input terminal.

* * * * *